United States Patent
Fujita

(10) Patent No.: US 10,603,798 B2
(45) Date of Patent: Mar. 31, 2020

(54) ROBOT

(71) Applicant: FANUC CORPORATION, Yamanashi (JP)

(72) Inventor: Junya Fujita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/150,440

(22) Filed: Oct. 3, 2018

(65) Prior Publication Data
US 2019/0160688 A1    May 30, 2019

(30) Foreign Application Priority Data

Nov. 28, 2017    (JP) ................. 2017-227876

(51) Int. Cl.

| | |
|---|---|
| *B25J 17/00* | (2006.01) |
| *B25J 17/02* | (2006.01) |
| *B25J 18/00* | (2006.01) |
| *B25J 13/08* | (2006.01) |
| *B25J 9/16* | (2006.01) |
| *B25J 19/06* | (2006.01) |
| *B25J 19/00* | (2006.01) |

(52) U.S. Cl.
CPC .......... *B25J 13/085* (2013.01); *B25J 9/1676* (2013.01); *B25J 9/1697* (2013.01); *B25J 13/089* (2013.01); *B25J 19/0029* (2013.01); *B25J 19/06* (2013.01); *G05B 2219/39082* (2013.01); *G05B 2219/40201* (2013.01); *G05B 2219/40339* (2013.01)

(58) Field of Classification Search
CPC .... B25J 19/0029; B25J 9/1676; B25J 13/085; B25J 19/06
See application file for complete search history.

(56) References Cited

U.S. PATENT DOCUMENTS

| | | | |
|---|---|---|---|
| 2004/0052630 A1 | 3/2004 | Nihei et al. | |
| 2006/0278621 A1* | 12/2006 | Takahashi | B23K 9/32 219/125.1 |
| 2009/0114052 A1 | 5/2009 | Haniya et al. | |

(Continued)

FOREIGN PATENT DOCUMENTS

| | | |
|---|---|---|
| EP | 1396314 A1 | 3/2004 |
| EP | 1930129 A1 | 6/2008 |

(Continued)

OTHER PUBLICATIONS

Office Action dated Oct. 29, 2019, in corresponding Japanese Application No. 2017-227876; 9 pages.

*Primary Examiner* — Jake Cook
(74) *Attorney, Agent, or Firm* — Maier & Maier, PLLC

(57) ABSTRACT

A robot includes a base; an articulated arm provided on the base; a sensor that is provided on the base and detects external force applied to the articulated arm; a controller that causes the articulated arm to perform a stop motion on a basis of a detected value of the sensor; and a cable having one end connected to devices mounted on a tip-side arm member of the articulated arm, and having the other end connected to the controller that controls the devices wherein the cable enters into the articulated arm from an arm member, passes through arm members which are disposed closer to the base side than the arm member is, and is connected to the controller.

4 Claims, 4 Drawing Sheets

(56) References Cited

U.S. PATENT DOCUMENTS

| | | |
|---|---|---|
| 2011/0010011 A1 | 1/2011 | Oka et al. |
| 2011/0219906 A1 | 9/2011 | Haniya et al. |
| 2012/0043831 A1 | 2/2012 | Sakakibara et al. |
| 2012/0048027 A1 | 3/2012 | Hashiguchi et al. |
| 2014/0121837 A1 | 5/2014 | Hashiguchi et al. |
| 2015/0027261 A1 | 1/2015 | Okahisa et al. |
| 2015/0027262 A1 | 1/2015 | Okahisa et al. |
| 2015/0108099 A1* | 4/2015 | Ferrero ............... B23K 11/314 219/86.33 |
| 2015/0258690 A1 | 9/2015 | Naitou |
| 2016/0214261 A1 | 7/2016 | Davis et al. |
| 2017/0028553 A1 | 2/2017 | Tsuda et al. |

FOREIGN PATENT DOCUMENTS

| | | |
|---|---|---|
| EP | 2113343 A2 | 11/2009 |
| EP | 2272636 A2 | 1/2011 |
| EP | 2422935 A2 | 2/2012 |
| EP | 2572837 A1 | 3/2013 |
| EP | 2572838 A1 | 3/2013 |
| EP | 2829368 A2 | 1/2015 |
| EP | 2829369 A2 | 1/2015 |
| JP | S63-127888 A | 5/1988 |
| JP | H05-237789 A | 9/1993 |
| JP | H10-166292 A | 6/1998 |
| JP | 2000-000792 A | 1/2000 |
| JP | 2004-098174 A | 4/2004 |
| JP | 2005-169489 A | 6/2005 |
| JP | 2006-021287 A | 1/2006 |
| JP | 2011-016183 A | 1/2011 |
| JP | 2011-110630 A | 6/2011 |
| JP | 2012-040626 A | 3/2012 |
| JP | 2012-051042 A | 3/2012 |
| JP | 2013-094935 A | 5/2013 |
| JP | 2015-058515 A | 3/2015 |
| JP | 2015-171747 A | 10/2015 |
| JP | 2017-030137 A | 2/2017 |
| WO | 2007/037131 A1 | 4/2007 |

* cited by examiner

ROBOT

CROSS-REFERENCE TO RELATED APPLICATIONS

This application is based on and claims priority to Japanese Patent Application No. 2017-227876 filed on Nov. 28, 2017, the content of which is incorporated herein by reference in its entirety.

FIELD

The present invention relates to a robot, and more specifically relates to a robot that detects contact with a person and performs a stop motion, a deceleration motion, or an avoidance motion.

BACKGROUND

As such a robot, there is known a robot that stops a motion of an articulated arm upon determining that a person has come into contact with the arm by using a detection result of a torque sensor for each axis of the arm or a contact sensor disposed on the entire surface of the arm (e.g., see Japanese Unexamined Patent Application, Publication No. 2017-030137).

Further, there is known a robot that is an industrial robot in a motion range of which a person is not present, the robot including: a device mounted on a wrist member of an articulated arm; and a cable having one end connected to the device and the other end connected to a controller, the cable being disposed in the arm (e.g., see Japanese Unexamined Patent Application, Publication No. 2000-000792).

SUMMARY

A robot of an aspect of the present disclosure includes: a base; an articulated arm provided on the base; a sensor that is provided on the base and detects external force applied to the articulated arm; a controller that causes the articulated arm to make a stop motion, a deceleration motion, or an avoidance motion on a basis of a detected value of the sensor; and a cable having one end connected to a device mounted on a tip-side member of the articulated arm, and having the other end connected to a cable-connected device that controls the device and supplies a fluid or electric power to the device. The robot is configured such that the cable enters into the articulated arm from a member subjected to insertion which is a member of the articulated arm on which the device is mounted or a member near the member of the articulated arm, passes through a member of the articulated arm which is disposed closer to the base side than the member subjected to insertion is, and is connected to the cable-connected device.

DETAILED DESCRIPTION

A robot 10 according to one embodiment of the present invention will be described below with reference to the drawings.

Figure 1:
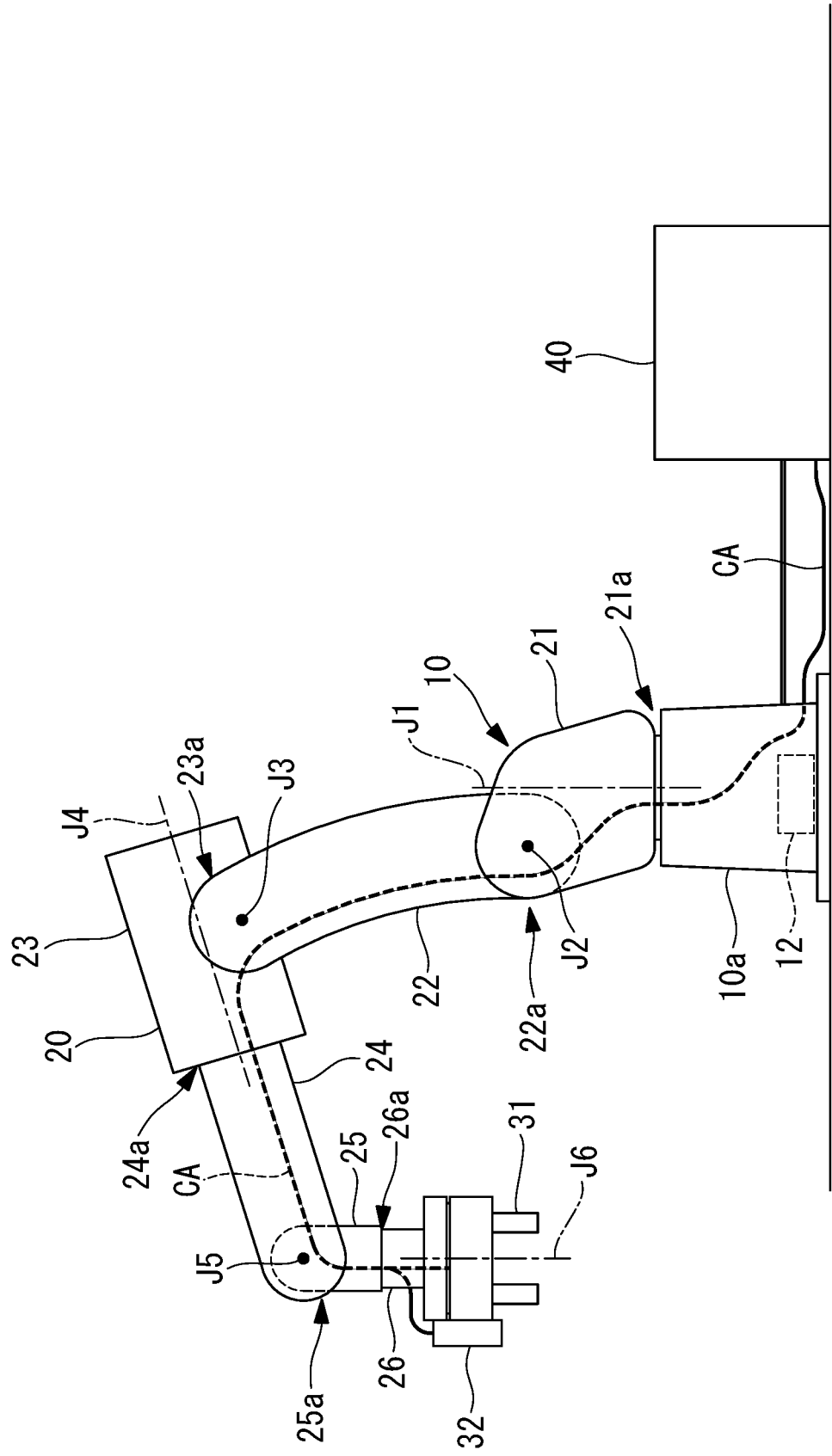
FIG. 1 is a schematic front view of a robot in an embodiment of the present invention.

As shown in FIG. 1, this robot 10 includes a base 10a and an articulated arm 20. A robot tool (device) 31, such as a machining tool or a hand, and a position/posture confirmation sensor (device) 32, such as a two-dimensional sensor, a three-dimensional sensor, or a camera for confirming a position, a posture and the like of a target are mounted at the tip of the articulated arm 20.

Figure 2:
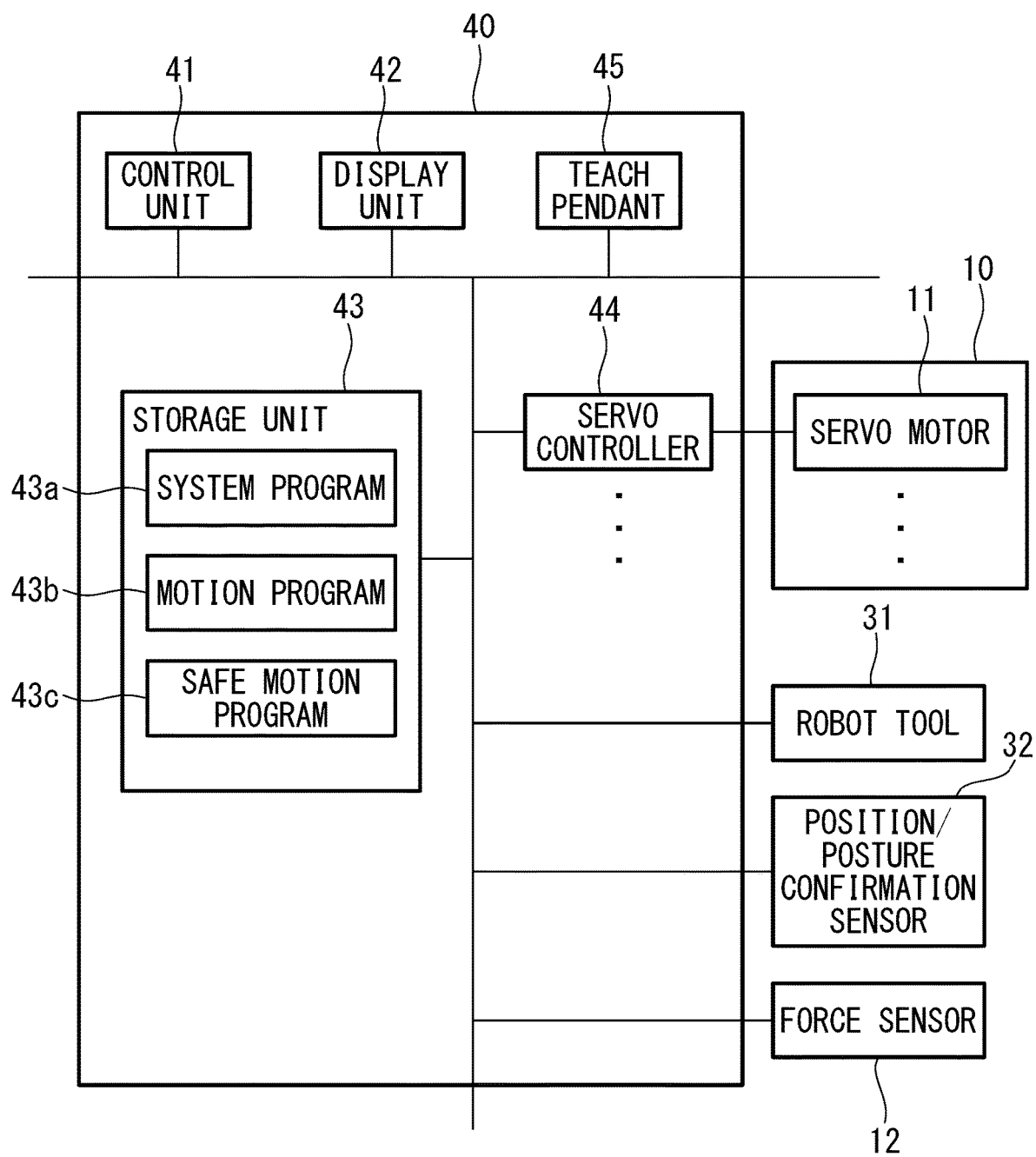
FIG. 2 is a block diagram of a controller of the robot in the present embodiment.

The articulated arm 20 of the robot 10 includes a plurality of arm members 21, 22, 23, 24, 25, 26, and joints 21a, 22a, 23a, 24a, 25a, 26a, and also includes a plurality of servo motors 11 that respectively drive the plurality of joints 21a, 22a, 23a, 24a, 25a, 26a (cf. FIG. 2). In the present embodiment, the articulated arm 20 including six joints is shown, but the articulated arm 20 may include seven joints or more or may include five joints or less.

As each servo motor 11, a variety of servo motors such as a rotary motor and a linear motor can be used. An operating position detector such as an encoder for detecting the operating position of each servo motor 11 is integrated in each servo motor 11, and a detected value of the operating position detector is transmitted to a controller 40.

It is configured such that the base 10a of the robot 10 is provided with a force sensor (sensor) 12 made up of six-axial force sensors, for example, and a detection result of the force sensor 12 is also transmitted to the controller 40 (cf. FIG. 2). The base 10a is made of a metal, for example. While supporting the articulated arm 20, the base 10a is fixed onto an installation surface or a fixed part which is fixed onto the installation surface.

As shown in FIG. 1, the arm member 21 is a turning member that is turned around an axis J1 by a joint 21a with respect to the base 10a. The arm member 22 is an axial member that is rotated around an axis J2 by a joint 22a with respect to the arm member 21. The arm member 23 is an axial member that is rotated around an axis J3 by a joint 23a with respect to the arm member 22. The arm member 24 is a wrist member (tip-side member) that is rotated around an axis J4 by a joint 24a with respect to the arm member 23. The arm member 25 is a wrist member (tip-side member) that is swung around an axis J5 by a joint 25a with respect to the arm member 24. The arm member 26 is a wrist member (tip-side member) that is rotated around an axis J6 by a joint 26a with respect to the arm member 25. In the present embodiment, the three arm members 24, 25, 26 on the tip side, which are the half of the six arm members 21, 22, 23, 24, 25, 26, are taken as the tip-side members. However, for example in the cases of fix arm members and seven arm members, three and four arm members can be respectively taken as the tip-side members.

In the present embodiment, the robot tool 31 and the position/posture confirmation sensor 32 are mounted on the arm member 26, but for example, the position/posture confirmation sensor 32 can be mounted on the arm members 24, 25. The robot tool 31 is provided with a motor for driving the robot tool 31. The motor and the position/posture confirmation sensor 32 are connected to the controller (cable-connected device) 40 via the cable CA and controlled by the controller 40.

As shown in FIG. 2, the controller 40 is provided with, for example: a control unit 41 including a CPU, a RAM, and the like; a display unit 42; a storage unit 43 including a nonvolatile storage, a ROM, and the like, a plurality of servo controllers 44 provided so as to respectively correspond to the servo motors 11 of the robot 10; and a teach pendant 45 connected to the controller 40 and portable by an operator. The teach pendant 45 may be configured so as to wirelessly communicate with the controller 40.

The storage unit 43 stores a system program 43*a*, and the system program 43*a* serves a basic function of the controller 40. The storage unit 43 stores at least one motion program 43*b* created by using the teach pendant 45. Further, the storage unit 43 stores a safe motion program 43*c* for causing the articulated arm 20 to make a motion for safety based on a detection result of the force sensor 12.

The control unit 41 operates in accordance with the system program 43*a*, reads the motion program 43*b* stored in the storage unit 43, temporarily stores the motion program 43*b* into the RAM, transmits a control signal to each servo controller 44 in accordance with the read motion program 43*b* while using a result of detection by the position/posture confirmation sensor 32, and controls with the control signal the motor of the robot tool 31 while controlling a servo amplifier of each servo motor 11 of the robot 10.

At this time, the control unit 41 reads the safe motion program 43*c* stored in the storage unit 43, temporarily stores the safe motion program 43*c* into the RAM, monitors the detection result of the force sensor 12 based on the read safe motion program 43*c*. When the detection result of the force sensor 12 exceeds a predetermined reference range, the control unit 41 determines that a protection target such as a person or an object has come into contact with the robot 10, and stops the operation of each servo motor 11 of the robot 10 (safe motion function).

Here, the control unit 41 appropriately changes the predetermined reference range in consideration of whether or not the robot 10 is holding the workpiece, the position of the tip of the robot 10, the posture of the robot 10, the motion speed of the robot 10, a weight of each of constituent parts constituting the robot 10, an inertial mass thereof, and the like.

The cable CA includes a plurality of signal lines and power lines. Some of the signal lines and the power lines at one end of the cable CA are connected to the robot tool 31, and others of the signal lines and the power lines at the one end of the cable CA are connected to the position/posture confirmation sensor 32. Further, the signal line and the power lines at the other end of the cable CA are connected to the controller 40. In the present embodiment, the cables CA for the robot tool 31 and the position/posture confirmation sensor 32 are unified, but the cables CA may be separated, and the signal line and the power line may be disposed in separate cables CA.

The cable CA extending from the robot tool 31 and the position/posture confirmation sensor 32 enters into the arm member 26 on which the robot tool 31 is mounted and the position/posture confirmation sensor 32, or enters into the arm member 26 via holes (not shown) provided in the arm members 25, 24 in the vicinity of the arm member 26. The cable CA is sequentially inserted through the insides of the arm member 25, the arm member 24, the arm member 23, the arm member 22, and the arm member 21, enters into the base 10*a* from the inside of the arm member 21 and comes outside the base 10*a* via a hole (not shown) formed on the side surface of the base 10*a*.

In this manner, the other end side of the cable CA is connected to the controller (cable-connected device) 40. A space for insertion of the cable CA is formed inside each of the arm members 21, 22, 23, 24, 25, 26 and inside the base 10*a*. A hole or a space for insertion of the cable CA is formed among each of the arm members 21, 22, 23, 24, 25, 26 and between the arm member 21 and the base 10*a*.

As thus described, in the present embodiment, the force sensor 12 that detects external force applied to the articulated arm 20 is provided on the base 10*a*, so that even in the case of generation of bending deformation or pulling force in the cable CA in the articulated arm 20 due to the motion of the articulated arm 20, the force sensor 12 on the base 10*a* is little or not affected, thereby enabling reduction or prevention of erroneous detection that a person has come into contact with the articulated arm 20.

Further, the cable CA is configured so as enter into the base 10*a* from the base end of the articulated arm 20, while entering into the articulated arm 20 from the arm member (member subjected to insertion) 26, and comes outside the robot 10 from the base 10*a* toward the controller 40. With the cable CA being disposed in the articulated arm 20 in this manner, it is possible to reduce the possibility of the person or the object being caught between the cable CA and the articulated arm 20.

Further, when the cable CA disposed in the articulated arm 20 is to be changed in accordance with the type of the device that is mounted at the tip of the robot 10, work for the change can be easily performed due to no contact sensor being provided on the surface of the articulated arm 20.

Figure 3:
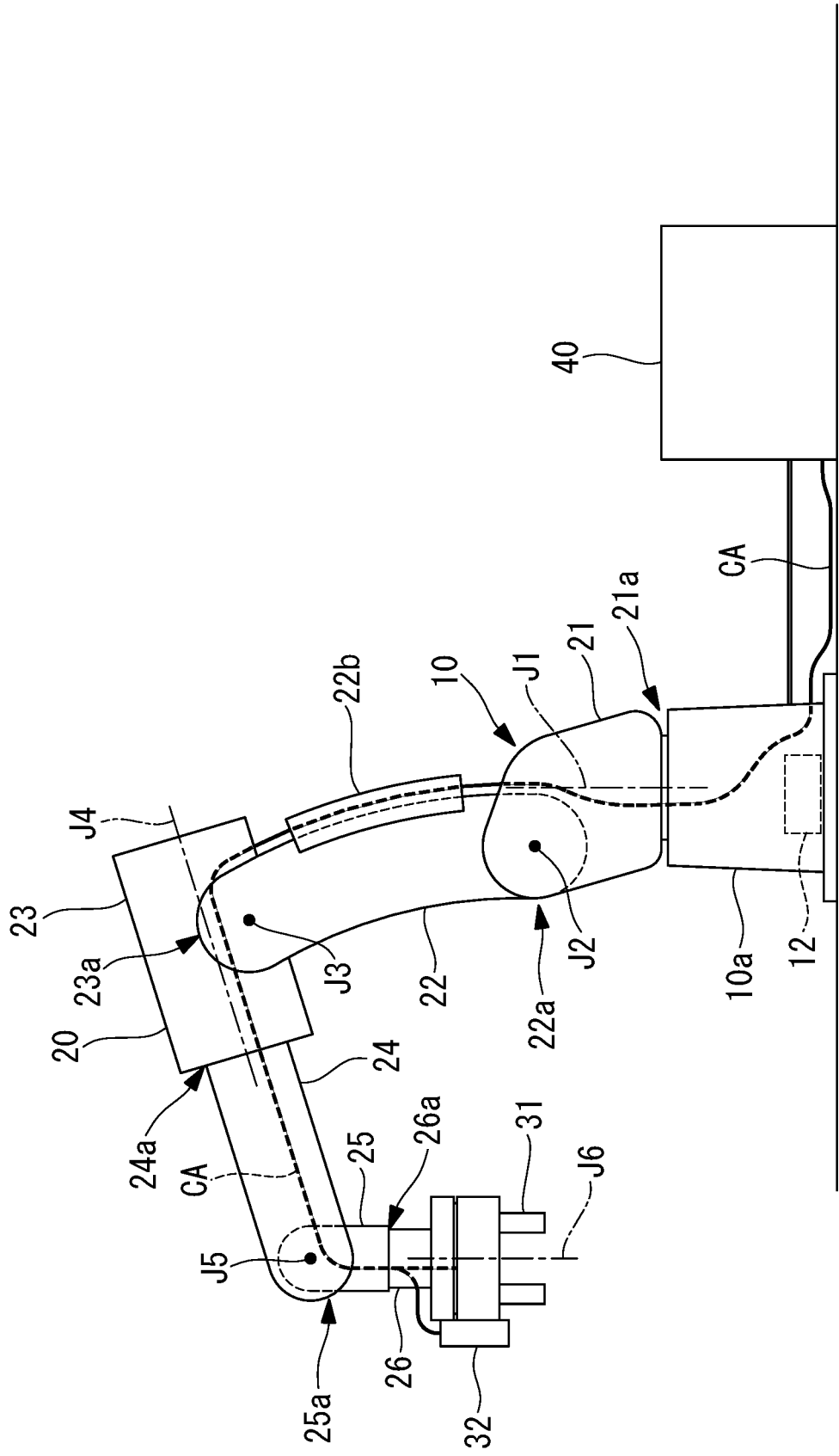
FIG. 3 is a schematic front view of a robot showing a modified example of the present embodiment.
Figure 4:
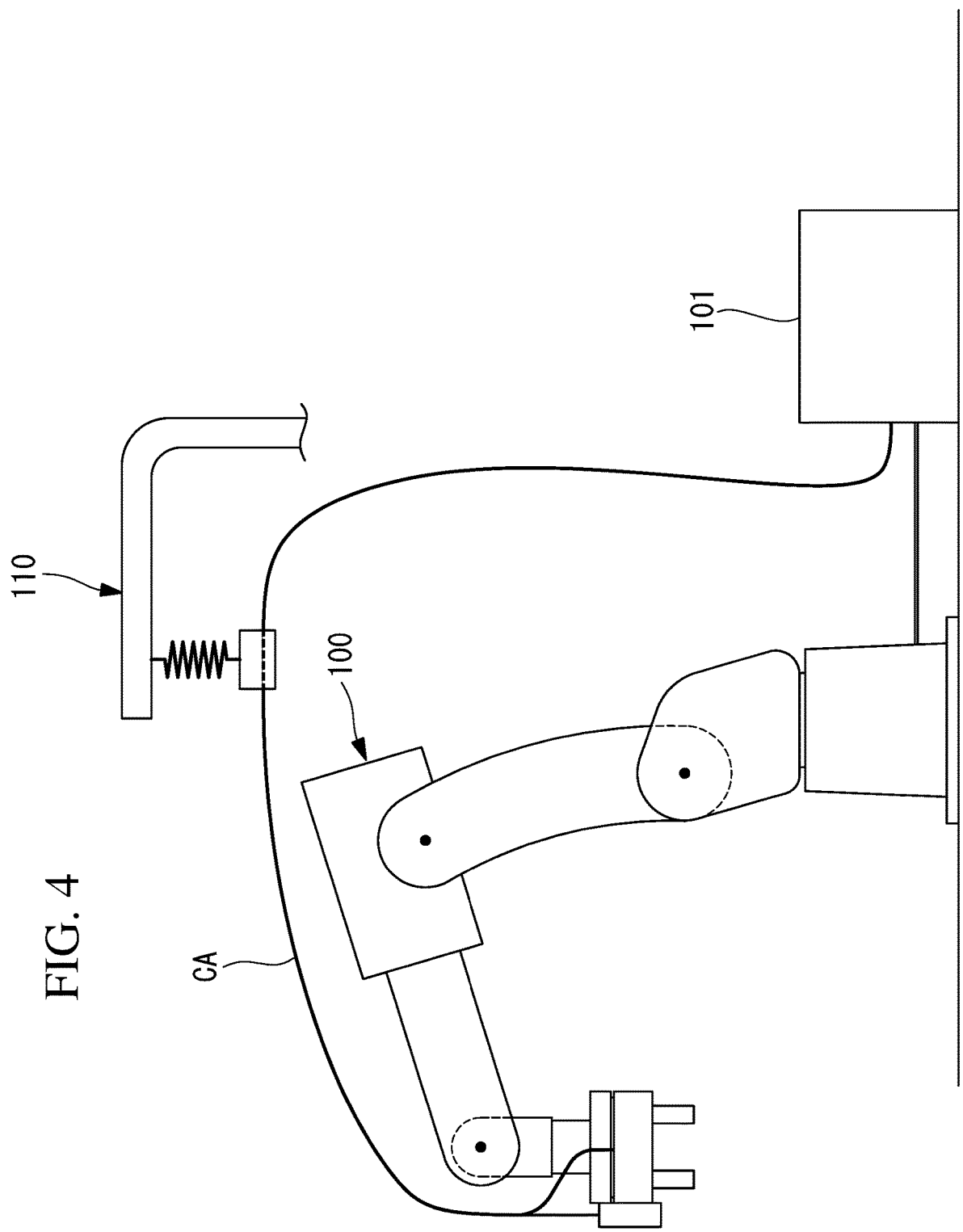
FIG. 4 is a schematic front view of a conventional robot.

In the present embodiment, the cable CA passing through the inside of each of the arm members 21, 22, 23, 24, 25, 26 has been shown. In contrast, as shown in FIG. 3, the cable CA may be configured so as to come outside the articulated arm 20 from, for example, a hole (not shown) formed in the arm member 23 and again enter inside the articulated arm 20 from a hole (not shown) formed in the arm member 21.

In this case, it may be configured such that the cable CA having once come outside the articulated arm 20 is disposed along the arm member 22, and the cable CA having come outside is disposed between the arm member 22 and the cover member 22*b* mounted on the arm member 22, so as to regulate the move of the cable CA.

As thus described, even when the cable CA is not inserted through the inside of some of the arm members 21, 22, 23, 24, 25, 26, the cable CA is disposed inside the articulated arm 20 on each of the tip side and the base end side of the articulated arm 20, thereby enabling reduction in the possibility that the person or the object is caught between the cable CA and the articulated arm 20.

Moreover, it may be configured such that the cable CA having come outside the articulated arm 20 from the arm member 23 is connected to the controller 40 without entering into the articulated arm 20 or the base 10*a*. Also in this case, with the cable CA being disposed in the articulated arm 20 from the tip side of the articulated arm 20, the possibility of the person or the object being caught between the cable CA and the articulated arm 20 can be reduced.

For example, when the controller 40 is unified with or adheres to the base 10*a*, the cable CA having passed through the articulated arm 20 and the cable CA having passed through the base 10*a* are connected to the controller 40 without coming outside as described above.

In the present embodiment, the motor of the robot tool 31 and the position/posture confirmation sensor 32 being connected to the controller 40 via the cable CA have been shown. However, the motor of the robot tool 31 and the position/posture confirmation sensor 32 may be respectively connected to dedicated controllers (cable-connected devices). Further, when there is a need to supply compressed air, pressurized hydraulic oil, or the like to the robot tool 31, a supply pipe for supplying this fluid can also be disposed as the cable CA in the same manner as above. In this case, the other end of the cable CA for supplying the compressed air, the pressurized hydraulic oil, or the like is connected to a fluid supply source.

Further, in the present embodiment, the function of stopping the operation of each servo motor 11 of the robot 10 has been shown as the safe motion function. In contrast, each servo motor 11 may be controlled as follows: when the detection result of the force sensor 12 exceeds the predetermined reference range, the control unit 41 operates in accordance with the safe motion program 43c, and when the detection result of the force sensor 12 exceeds the predetermined reference range, it is determined that the protection target such as the person or the object has come into contact with the robot 10 and the robot 10 makes a predetermined avoidance motion.

As the avoidance motion, for example, each servo motor 11 is controlled such that the control unit 41 estimates the direction of the contact based on the detection result of the force sensor 12, and the robot 10 moves in the opposite direction to the direction of the contact.

Meanwhile, each servo motor 11 may be controlled such that, when the detection result of the force sensor 12 exceeds the predetermined reference range, the motion speed of the robot 10 is decreased.

From the above-described embodiments, the following aspects of the present disclosure are derived.

A robot of an aspect of the present disclosure includes: a base; an articulated arm provided on the base; a sensor that is provided on the base and detects external force applied to the articulated arm; a controller that causes the articulated arm to make a stop motion, a deceleration motion, or an avoidance motion on a basis of a detected value of the sensor; and a cable having one end connected to a device mounted on a tip-side member of the articulated arm, and having the other end connected to a cable-connected device that controls the device and supplies a fluid or electric power to the device. The robot is configured such that the cable enters into the articulated arm from a member subjected to insertion which is a member of the articulated arm on which the device is mounted or a member near the member of the articulated arm, passes through a member of the articulated arm which is disposed closer to the base side than the member subjected to insertion is, and is connected to the cable-connected device.

In the above aspect, the sensor that detects external force applied to the articulated arm is provided on the base. Therefore, even if bending deformation or pulling force is generated in the cable in the articulated arm due to the move of the articulated arm, the sensor on the base is little or not affected, thereby enabling reduction or prevention of erroneous detection that a person has come into contact with the arm.

Further, the cable enters into the articulated arm from the member subjected to insertion which is a member of the articulated arm on which the device is mounted or a member near the member of the articulated arm, passes through a member of the articulated arm which is disposed closer to the base side than the member subjected to insertion is, and is connected to the cable-connected device. With the cable being disposed in the articulated arm from the tip side of the articulated arm in this manner, the possibility of the person or the object being caught between the cable and the articulated arm can be reduced.

In the above aspect, the cable is preferably configured to enter into the base from a base end of the articulated arm while entering into the articulated arm from the member subjected to insertion, passes through the base, and is connected to the cable-connected device. As thus described, the cable is disposed in the articulated arm on each of the tip side and the base end side of the articulated arm, so that the possibility of the person or the object being caught between the cable and the articulated arm can further be reduced.

In the above aspect, it is preferable that the cable is not exposed outside the articulated arm from the member on which the device is mounted to the base end of the articulated arm.

With such a configuration, the cable is hardly or not at all disposed to the outside of the articulated arm, so that the possibility of the person or the object being caught between the cable and the articulated arm can further be reduced.

According to the aforementioned aspect, it is possible to reduce or prevent erroneous detection that a person has come into contact with the robot, and furthermore, it is possible to reduce the possibility that a person or an object is caught between the cable and the arm.

REFERENCE SIGNS LIST

10 robot
10a base
11 servo motor
12 force sensor (sensor)
20 articulated arm
21 to 26 arm member
21a to 26a joint
22b cover member
31 robot tool (device)
32 position/posture confirmation sensor (device)
40 controller
41 control unit
42 display unit
43 storage unit
43a system program
43b motion program
43c safe motion program
44 servo controller
45 teach pendant
CA cable

The invention claimed is:
1. A robot comprising:
a base; and
an articulated arm provided on the base,
wherein the articulated arm comprises: a first arm member which is supported by the base that is fixed onto an installation surface or a fixed part, and the first arm member is movable relative to the base around a first axis line; a second arm member which is supported by the first arm member and which is movable relative to the first arm member around a second axis line; a third arm member which is supported by the second arm member and which is movable relative to the second arm member around a third axis line; and a distal-end-side arm supported by the third arm member,
wherein the distal-end-side arm comprises a plurality of distal-end-side arm members connected in series,
wherein the robot further comprises:
a sensor that is provided in the base and detects external force applied to the articulated arm;
a controller that causes the articulated arm to make a stop motion, a deceleration motion, or an avoidance motion on a basis of a detected value of the sensor; and
a cable having one end connected to a device mounted on a distal end of the distal-end-side arm, and having the other end connected to a cable-connected device that controls the device and supplies a fluid or electric power to the device, wherein the cable enters into the articulated arm from one of the distal-end-side arm members and passes through the first arm member to be connected to the cable-connected device.

2. The robot according to claim 1, wherein the cable enters into the base from a base end of the articulated arm while entering into the articulated arm from the one of the distal-end-side arm members and passing through the base, and the cable is connected to the cable-connected device.

3. The robot according to claim 1, wherein the cable is not exposed outside the articulated arm from one of the distal-end-side arm members on which the device is mounted to the base end of the articulated arm.

4. The robot according to claim 1, wherein the sensor detects the external force which is applied to any of the first arm member, the second arm member, and the third arm member.

* * * * *